United States Patent [19]

Holt

[11] Patent Number: 4,551,897

[45] Date of Patent: Nov. 12, 1985

[54] STRING REMOVER

[75] Inventor: Dewey L. Holt, Winston-Salem, N.C.

[73] Assignee: R. J. Reynolds Tobacco Company, Winston-Salem, N.C.

[21] Appl. No.: 551,796

[22] Filed: Nov. 15, 1983

[51] Int. Cl.⁴ .............................................. B23P 19/02

[52] U.S. Cl. ...................................................... 29/235

[58] Field of Search ................. 29/235; 242/100.1, 53; 140/102.5

[56] References Cited

U.S. PATENT DOCUMENTS 548,420 10/1895 Bauer .............................. 140/102.5

681,251 8/1901 Nigg ................................ 140/102.5

1,463,870 8/1923 Campbell ......................... 140/102.5

4,455,729 6/1984 Dugan ................................. 29/235

*Primary Examiner*—James L. Jones, Jr.

*Attorney, Agent, or Firm*—Joseph E. Root III

[57] ABSTRACT

A string remover for breaking and removing encircling string or twine bale securing members, is disclosed. A plurality of generally parallel fingers are placed straddling the string and are caused to rotate. The string wraps about the fingers and is tensioned to the point of breaking. After it has broken, it continues to be wrapped about the fingers. A slideable push-off plate is then moved axially along the fingers and forces the wound up string off the fingers so that it can be disposed of. The string remover can be driven by a portable power source such as a hand held electric drill.

1 Claim, 5 Drawing Figures

STRING REMOVER

FIELD OF THE INVENTION

The present invention is directed generally to a string remover. More particularly, the present invention is directed to a string remover and coiler. Most specifically, the present invention is directed to a string remover and coiler for use in removing binding string or twine from around a bale or bundle. At least two rigid fingers extend out generally parallel to each other from a rotatable hub that can be driven by a suitable portable power source such as an electric drill. A slidable push-off plate is carried by the rotatable hub and is slidable axially along the length of the fingers while the string remover is being rotated by the drive means. String to be removed from about a bale or package is wrapped about the rotating fingers and is tensioned until it breaks. After the string has been removed from the bundle and has been wrapped about the fingers, the push-off plate can be slid toward the free ends of the fingers to push the coiled string or twine into a suitable container.

DESCRIPTION OF THE PRIOR ART

A number of commodities and materials such as; for example, tobacco leaves, are prepared for shipment or handling by being grouped or arranged into bales of various sizes. Typically this is accomplished by collecting a number of the tobacco leaves and placing them in an agricultural bale compactor. The bale, once compacted, is held in its final shape by using encircling lengths of a fastening material such as string, twine, cord or the like. The so formed bales are thus given a uniform size which facilitates handing, shipment, and storage.

When the bales of tobacco leaves or other commodities arrive at their point of use such as a cigarette manufacturing facility, the bales must be undone so that the component leaves of tobacco or the like can be processed. Typically, this has been accomplished in the past by using a sharp cutting tool such as a knife to cut the encircling string or twine. These bales of tobacco are conventionally approximately 12 inches thick, 24 inches high and 36 inches long, and usually three or more bands of wrap are used to hold the bale together. As can well be appreciated, a number of these string or twine bands must be severed during the course of a normal day's operation. With so many cutting operations taking place, it is virtually certain that the person doing the cutting will inadvertently injure himself even when exercising a reasonable amount of care. As with any other repetative operation this standard of care wanes and the result is usually painful. Furthermore, a sharp cutting tool such as a knife or razor blade either becomes dull and must be sharpened, becomes misplaced and must be found, or becomes broken and must be discarded.

A companion problem is one of disposal of the string or twine after it has been cut and removed from the bale. Although it is not a difficult task to throw one severed piece of string into a proper trash receptacle, the collecting and disposing of numerous such pieces of string becomes a chore which is not always attended to. If pieces of the securing twine are left lying about, they are apt to become mixed in with the material being unbundled and processed. In the case of materials which will eventually be used by the consumer, such as tobacco leaves that will be used in the making of cigarettes, the inclusion of a contaminant such as a piece of string is very undesirable. The consumer will understandably be upset if he discovers a foreign contaminant such as a section of string in his cigarette. Thus it is important to keep the sections of severed string out of the tobacco.

Accordingly, it may be seen that a need exists for a string or twine severing or breaking means which includes some way to collect the severed string to aid in its disposal. This string remover must be safe, durable, easy to operate, reliable and uncomplicated.

SUMMARY OF THE INVENTION

It is an object of the present invention to provide a string remover.

Another object of the present invention is to provide a string remover and collecting assembly.

A further object of the present invention is to provide a string remover that is power driven.

Yet another object of the present invention is to provide a string remover that can be used by an unskilled worker.

Still another object of the present invention is to provide a string remover that does not become dull or broken and that is not easily lost.

As will be set forth in greater detail in the description of the preferred embodiment, as set forth hereinafter, the string remover in accordance with the present invention includes a rotatable shank that carries at least a pair of generally parallel spaced fingers at one end. The other end of the shank is sized to fit into the chuck of a conventional power hand drill or another similar rotary power means. A push-off plate, having an enlarged planar face, is secured to one end of a sleeve that slideably encircles the shank with the two spaced fingers of the shank protruding through the push-off plate. A handwheel is secured to a suitable bearing that is, in turn, carried on the sleeve of the push-off member. In use, the string remover is placed so that the two fingers straddle the string or twine band that is encircling the tobacco bale. Actuation of the power means causes the fingers to rotate thereby wrapping the string about the fingers. The string is tensioned until it breaks and is then taken up on the rotating fingers. After the string has been wrapped on the fingers, the push-off plate can be slid axially along the fingers to slide the string off the fingers and into a suitable container.

The string remover in accordance with the present invention has no sharp edges on which the operator can cut himself thereby substantially reducing injuries. Further, the push-off plate shields the rotating fingers from the operator. The string remover does not become dull and will not wear out and hence does not need to be replaced. Since it is driven by a suitable power source, it is also apt not to be misplaced. The power drive means also supplies enough torque to the assembly so that the twine bands are quickly broken and wrapped about the fingers thus reducing the time required to sever and remove a number of the bands from a large number of tobacco bales.

After the string or twine has been broken, it is wrapped about the rotating fingers of the string remover. Once the string has been coiled about the fingers, it can be removed by sliding the push-off plate axially toward the free ends of the fingers. Since this can be acomplished with the string remover positioned above a suitable trash receptacle or container, the string that has been removed does not have an opportunity to become mixed in with the commodity being unbaled and thus does not increase the risk of product contamination.

The string remover in accordance with the present invention operates in a safe, efficient manner. It is rugged and durable, is not apt to become misplaced, and collects the broken string or twine binders. It is far superior to the prior art methods and devices that had been previously used and provides a working tool that solves a long standing problem.

BRIEF DESCRIPTION OF THE DRAWINGS

While the novel features of the string remover in accordance with the present invention are set forth with particularity in the appended claims, a full and complete understanding of the present invention may be had by referring to the description of a preferred embodiment as set forth hereinafter and as may be seen in the drawings in which:

DESCRIPTION OF THE PREFERRED EMBODIMENT

Figure 1:
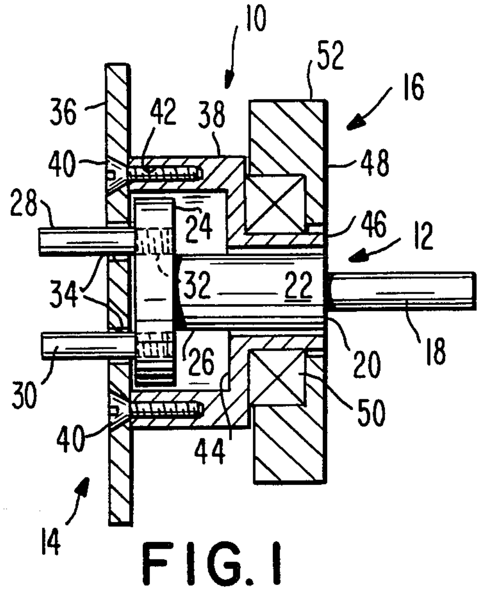
FIG. 1 is a side elevation view, partly in section of the string remover in accordance with the present invention with the push-off plate in the string removing position.
Figure 2:
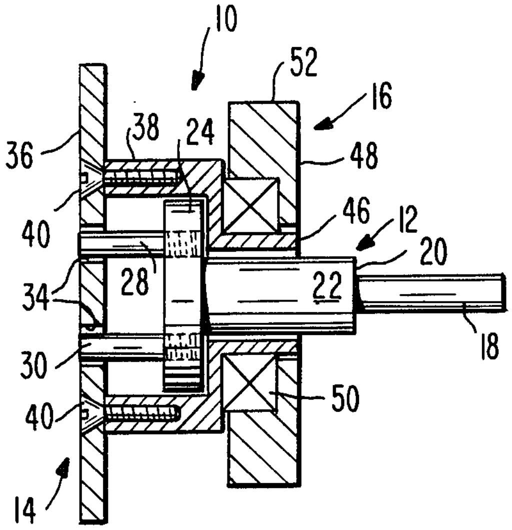
FIG. 2 is a side elevation view, partly in section showing the string remover with the push-off plate in the string discarding position.
Figure 3:
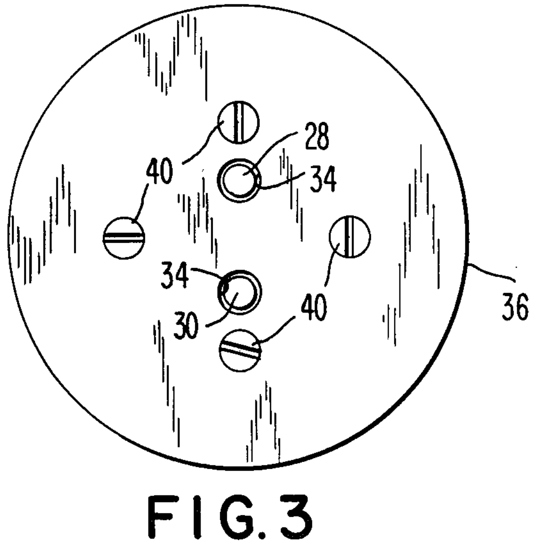
FIG. 3 is a front elevation view of the string remover showing the push-off plate and fingers.

Referring initially to FIGS. 1 and 2, there may be seen generally at 10, a string remover in accordance with the present invention. In FIG. 1 the string remover is shown in the string winding mode while in FIG. 2 it is shown in the string discarding mode. The string remover includes three components, a finger carrying shank assembly 12, a push-off plate and sleeve assembly 14, and a hand wheel and bearing assembly 16.

Figure 4:
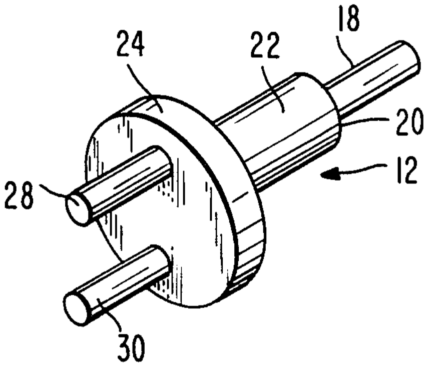
FIG. 4 is a perspective view of the fingers and shank portion of the string remover.
Figure 5:
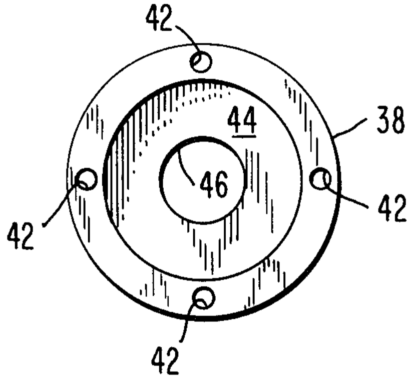
FIG. 5 is a front elevation view of the sleeve with the push-off plate removed for clarity.

Turning now to FIG. 4, the finger carrying shank assembly 12 includes a shaft 18 which extends rearwardly from a first end 20 of an intermediate shank 22. An enlarged hub 24 is formed at a second end 26 of shank 22. In the preferred embodiment, shaft 18, shank 22, and hub 24 are formed as one piece of metal in a suitable machining operation such as turning. The shaft 18 is sized so that it can be received in the mounting chuck (not shown) of a conventional hand held electric drill or a similar power source. A pair of string engaging fingers 28, 30 are secured to hub 24 at first ends such as by being screwed into threaded apertures 32 in hub 24. Fingers 28 and 30 extend forwardly from hub 24 to a sufficient distance to allow them to straddle a piece of string that is secured about a bale. While two such fingers are shown, it will be understood that the hub could carry additional fingers, if desired.

Fingers 28 and 30 extend forwardly of hub 24 through a pair of holes 34 formed in a generally planar push-off plate 36. This push-off plate 36 is secured to a first end of a cylindrical sleeve 38 portion of push-off plate and sleeve assembly 14 by securement means such as spaced screws 40 which are received in threaded bores 42 in sleeve 38. The second end of sleeve 38 is joined to a connecting web 44 that extends radially inwardly to a reduced diameter cylinder 46. The inner diameter of cylinder 46 is sized to be concentric with and slideable along shank 22 thereby allowing the push-off plate 36 to slide axially along fingers 28 and 30 between the string removal position shown in FIG. 1 and the string discarding position shown in FIG. 2. It will be understood that the axial travel of push-off plate 36 is limited by its engagement with hub 24 in the string removal position shown in FIG. 1, and the engagement of web 44 with hub 24 in the string discarding position seen in FIG. 2.

Movement of push-off plate 36 between the two positions shown in FIGS. 1 and 2 is accomplished by use of the handwheel assembly 16. A handwheel 48 is secured by any suitable means (not specifically shown) to a bearing 50 which is, in turn, carried by the reduced diameter cylinder 46. Thus handwheel 48 can remain stationary while cylinder 46 rotates. The outer peripheral surface 52 of handwheel can be textured such as by knurling to improve the operator's grip on the handwheel.

In operation, the shaft 18 is positioned within the chuck of an electric drill or the like and the chuck is tightened about the shaft 18. Actuation of the drill's motor causes the shank assembly 12 to rotate so that fingers 28 and 30 will also rotate. Since these fingers pass through push-off plate 36, it will also be caused to rotate. The fingers can be positioned so that they straddle a piece of string or twine that is to be removed from a bale of tobacco leaves or the like. With the push-off plate 36 retracted, as seen in FIG. 1, rotation of the fingers 28 and 30 causes the string to wrap about the fingers. As tension is applied to the string, it breaks and continues to be wrapped or coiled about fingers 28 and 30. Once the entire length of the string or twine has been coiled up, the push-off plate 36 can be moved axially along fingers 28 and 30 by the operator who grasps handwheel 48 and slides it to the left, to the position for string discarding shown in FIG. 2. After the string or twine has been discarded in a suitable container, the push-off plate 36 can be retracted to the right back to the string removing position shown in FIG. 1 so that the fingers are again free to engage another bale wrapping string or twine.

While a preferred embodiment of a string remover in accordance with the present invention has been set forth fully and completely in the above description of a preferred embodiment, it will be obvious to one of skill in the art that a number of changes in; for example, the number of fingers, the means for securing the push-off plate to the sleeve, the means for attaching the handwheel and bearing to the cylinder and the like could be made without departing from the true spirit and scope of the subject invention which is accordingly to be limited only by the following claims.

I claim:

1. A string remover for breaking and coiling a bale encircling length of string, said string remover comprising:

a plurality of spaced, generally parallel, rigid fingers secured at first ends to a first face of a hub and extending forwardly of said hub, said finger adapted to straddle the string to be removed;

a shank having a rearwardly extending shaft at a first end and said hub at a second end;

a push-off plate carried by and slideable along said fingers between a string removal position and a string discarding position to effect separation of the string from said finger, said fingers passing through apertures in said push-off plate;

a sleeve concentric with, and slideable along said shank, said push-off plate being secured at a first end of said sleeve, a second end of said sleeve terminating in a radially inwardly extending web;

a cylinder secured to said web and closely overlying said shank, said cylinder carrying a bearing mounted handwheel; and means to rotate said shank and said fingers to cause tensioning and breakage of the string and coiling of the broken string about said fingers, movement of said handwheel forwardly along said shank effecting movement of said push-off plate forwardly relative to said fingers to effect separation of said coiled string from said fingers whereby the string may be removed from its bale encircling position.

* * * * *